United States Patent [19]
Rafac

[11] Patent Number: 5,269,196
[45] Date of Patent: Dec. 14, 1993

[54] INJECTION MOLDED PLASTIC HANDLEBAR

[75] Inventor: James A. Rafac, Celina, Ohio

[73] Assignee: Huffy Corporation, Miamisburg, Ohio

[21] Appl. No.: 880,547

[22] Filed: May 8, 1992

[51] Int. Cl.$^5$ .............................................. B62K 21/12
[52] U.S. Cl. ................... 74/551.1; 280/281.1
[58] Field of Search .............. 74/551.1, 551.2; 280/281.1, 282

[56] References Cited

U.S. PATENT DOCUMENTS

| | | | |
|---|---|---|---|
| 2,114,733 | 4/1938 | Anderson | 74/551.1 |
| 2,487,661 | 11/1949 | McCauley | 74/551.1 X |
| 3,039,791 | 6/1962 | Horowitz et al. | 280/282 X |
| 3,833,242 | 9/1974 | Thompson | 280/281.1 |
| 4,008,903 | 2/1977 | Ramond | 280/279 |
| 4,015,854 | 4/1977 | Ramond | 280/281 R |
| 4,245,522 | 1/1981 | Robinson | 74/480 R |
| 4,322,087 | 3/1982 | Addicks | 74/551.1 X |
| 4,596,398 | 6/1986 | Grossi | 280/282 |
| 4,828,285 | 5/1989 | Foret et al. | 280/279 |
| 4,901,209 | 2/1990 | Nitz | 362/72 |

FOREIGN PATENT DOCUMENTS

| | | | |
|---|---|---|---|
| 0035359 | 9/1981 | European Pat. Off. | 74/551.1 |
| 3143266 | 5/1983 | Fed. Rep. of Germany . | |
| 415259 | 10/1946 | Italy | 74/551.1 |
| 2138755 | 10/1984 | United Kingdom . | |

*Primary Examiner*—Rodney H. Bonck
*Attorney, Agent, or Firm*—Biebel & French

[57] ABSTRACT

An injection molded handlebar for a bicycle is disclosed including a plastic integral unit having a central hub portion, a support body and first and second laterally extending arm portions. A stem member is provided extending through an aperture in the support body and including an insert plate welded to the stem member for rigidly attaching the stem member to the integral unit. Brake lever mounts are provided molded integrally with and extending forwardly from the arm portions. In addition, shift lever mounts are molded into an upper surface of the handlebar adjacent to the brake lever mounts.

21 Claims, 3 Drawing Sheets

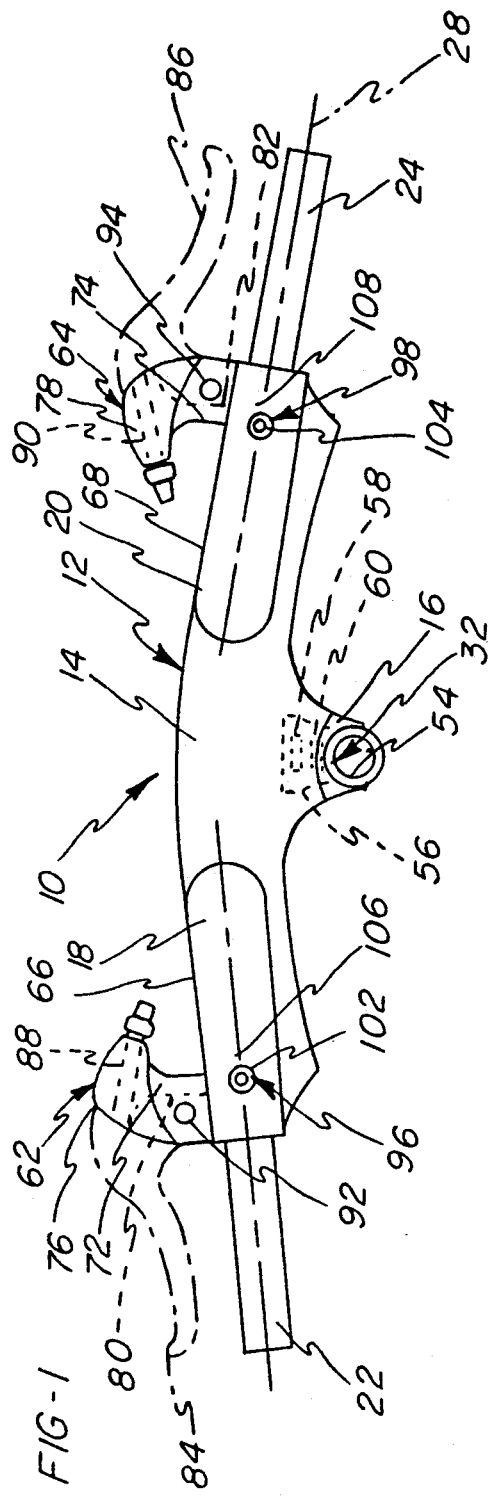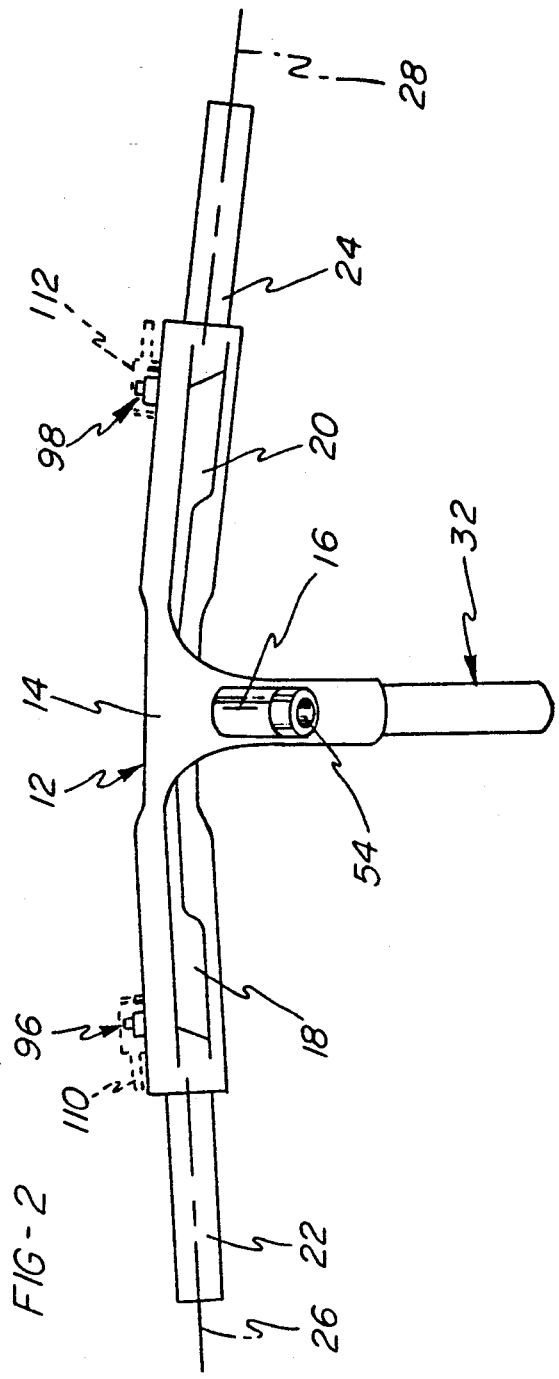

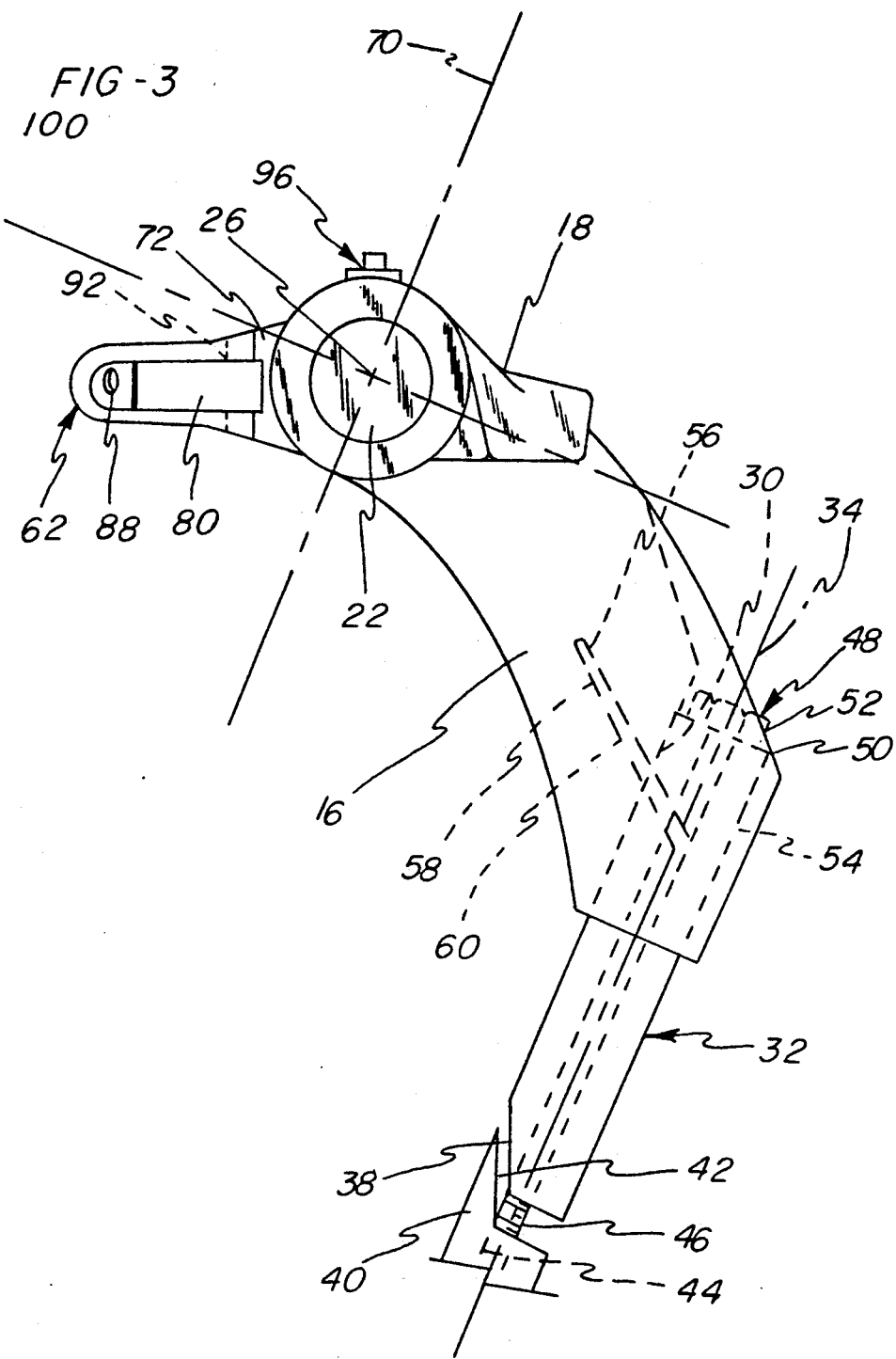

INJECTION MOLDED PLASTIC HANDLEBAR

BACKGROUND OF THE INVENTION

The present invention relates to a bicycle handlebar and, more particularly, to an injection molded plastic handlebar for a bicycle.

Several attempts have been made to replace conventional metal bicycle parts with plastic parts which have the advantage of being lightweight and economical to manufacture. However, as a result of the molded parts often being formed with a specialized configuration, components such as brake levers and shift mechanisms for mounting to the molded parts must also be of a specialized design such that conventional hardware is not usable with the plastic molded parts.

For example, U.S. Pat. No. 4,245,522 to Robinson discloses molded hand grip members which are designed to be mounted to opposite ends of a handlebar cross member and which are each designed to accommodate a pair of brake levers and a shift lever. The levers are especially designed to fit within the handlebar structure. In addition, this design requires assembly between the hand grip members and the cross tube, and the junction between the cross tube and a stem member results in the formation of a location about which the hand grip members may rotate during use of the bicycle.

U.K. Patent Application No. 2138755 discloses a molded plastic handlebar having opposing hand grip portions formed in the shape of loops. The hand grip portions are each provided with recesses for receiving specially designed brake levers. In addition, a metal tube is embedded within the body of the handlebar for engaging a clamp portion of a steering column such that the handlebar is pivotable in a vertical direction relative to the steering column.

While the above-described designs for molded bicycle handlebars provide a lightweight alternative to conventional bicycle handlebars, these designs also require special components which depart from the use of hardware typically used with handlebars having a conventional design and thus increase the requirements for parts and tooling to produce a completed handlebar. In addition, the abovedescribed designs permit rotational movement of the handlebars about a horizontal axis such that inadvertent movement of the handlebar about the horizontal axis may occur during use of the bicycle.

Accordingly, there is a need for a molded handlebar which is adapted to be used with conventional hardware for mounting the handlebar and for controlling operation of the brake and shift mechanisms. In addition, there is a need for a molded handlebar which is adapted to be mounted to a standard steering column of a bicycle and which ensures stable positioning of the handlebar.

SUMMARY OF THE INVENTION

The present invention provides an injection molded handlebar for a bicycle including a plastic integral unit formed of a central hub portion, a support body and first and second arm portions. The central hub portion defines an upper central portion of the handlebar and the support body is formed integrally with the hub portion and extends in a downward and rearward direction from the hub portion.

The first and second arm portions are formed integrally with the hub portion and extend laterally from the hub portion in opposite directions. Each of the arm portions terminate at a substantially cylindrical hand grip portion distal from the hub portion, and each of the hand grip portions define a respective central axis through the length thereof.

The support body includes means defining an aperture for engaging a tubular stem member extending substantially vertically through the support body. The stem member defines a longitudinal axis and includes a clamping end distal from the support body. The clamping end is formed with a conventional ramp surface extending upwardly at an acute angle relative to the longitudinal axis for cooperation with a wedge nut. The stem member further includes an adjustment end and the aperture in the support body extends through an upper surface of the support body to provide access to a clamping bolt having a head located at the adjustment end and having a body extending downwardly through the stem for engaging a wedge nut located at the clamping end.

First and second brake lever mounts are provided extending from the first and second arm portions, respectively, adjacent to the hand grip portions. Each of the brake lever mounts extends forwardly away from respective first reference planes defined by sets of lines extending parallel to the longitudinal axis of the stem member and passing through a respective central axis of each of the hand grip portions.

First and second shift lever mounts are molded into the first and second arm portions adjacent to a respective one of the first and second brake lever mounts. The shift lever mounts extend upwardly away from second reference planes defined by sets of lines extending perpendicular to the longitudinal axis and passing through a respective central axis of each of the hand grip portions.

In addition, the handlebar of the present invention may be molded with a desired color or a combination of colors, and may incorporate decals embedded in the handlebar during the molding operation.

The brake lever and shift lever mounts are molded into the handlebar during the formation of the plastic integral unit and are adapted to receive conventional mounting hardware for the brake levers and shift levers.

In addition, the stem member is preferably provided with an insert member attached to the stem member and extending at an angle relative to the longitudinal axis upwardly and forwardly through an interior portion of the support body toward the central hub portion. The insert member ensures that the plastic integral unit remains rigidly attached to the stem member to thereby provide a stable support structure for the handlebar.

Other objects and advantages of the invention will be apparent from the following description, the accompanying drawings, and the appended claims.

BRIEF DESCRIPTION OF THE DRAWINGS

FIG. 1 is a top plan view of the injection molded handlebar of the present invention;

FIG. 2 is a rear elevational view of the handlebar;

FIG. 3 is a side elevational view of the handlebar taken along the central axis of the left hand grip.

DETAILED DESCRIPTION OF THE PREFERRED EMBODIMENT

Figure 4:
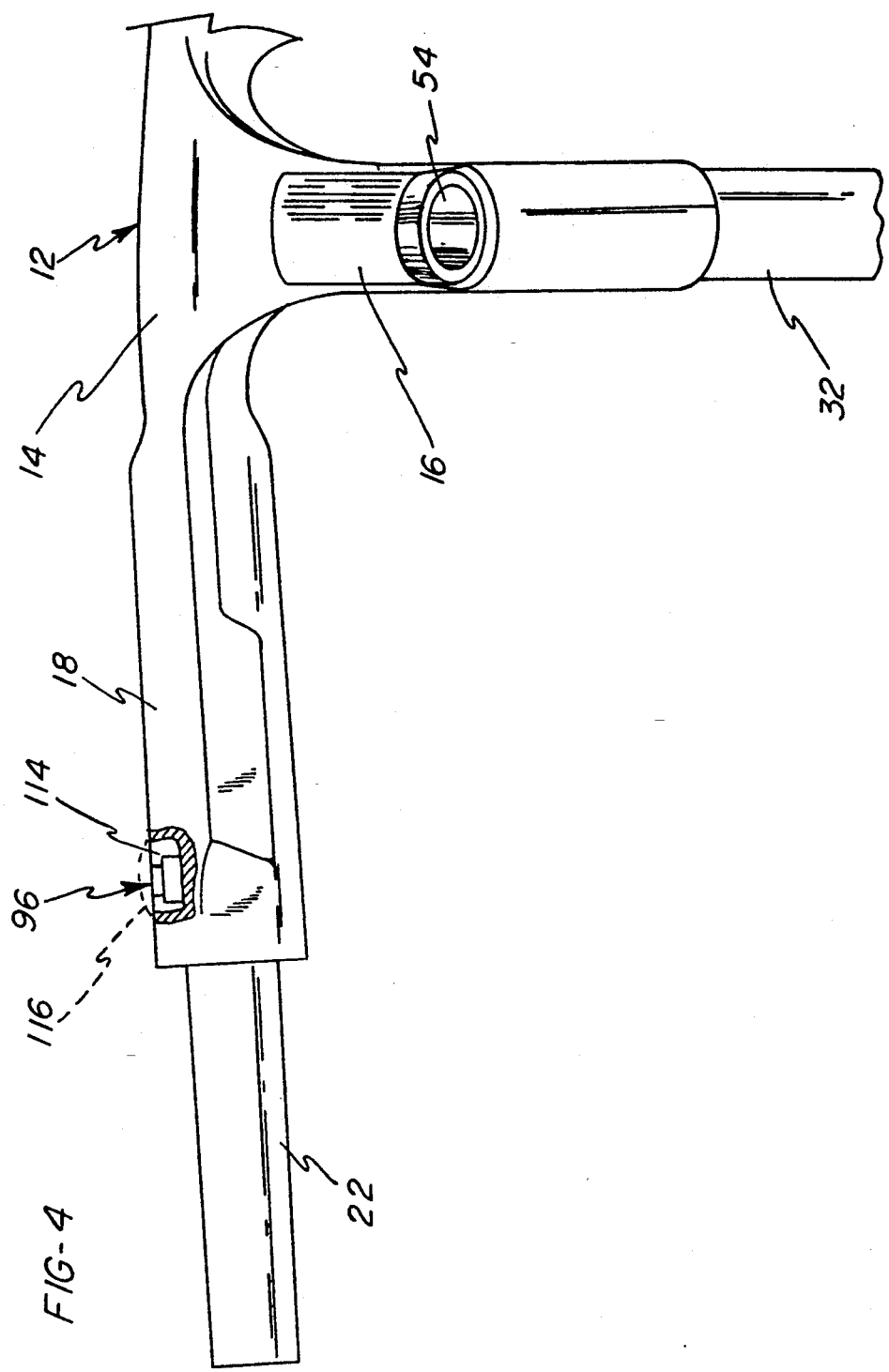
FIG. 4 is a rear elevational view of a left arm portion of the handlebar partially cut away to show an alternative shift lever mount.

Referring to FIGS. 1 and 2, the handlebar 10 of the present invention includes a plastic integral unit 12 comprising a central hub portion 14, a support body 16 and first and second arm portions 18, 20. The central hub portion 14, support body 16 and arm portions 18, 20 are all formed during a single injection molding process.

The central hub portion 14 defines an upper central portion of the handlebar and the support body 16 is formed integrally with the hub portion and extends in a downward and rearward direction from the hub portion 14, as may be further seen in FIG. 3.

The first and second arm portions 18, 20 are formed integrally with the hub portion 14 and extend laterally from the hub portion 14 in opposite directions. Each of the arm portions 18, 20 terminate in a substantially cylindrical hand grip portion 22, 24, respectively, distal from the hub portion 14, and each hand grip portion 22, 24 defines a respective central axis 26, 28 through the length thereof.

It should be noted that the hand grip portions 22, 24 are formed with end surfaces molded integrally with the cylindrical wall surfaces of the hand grip portions 22, 24 to thereby eliminate the need for separate end caps to be assembled onto the ends of the hand grip portions 22, 24. In addition, it should be noted that the hand grip portions 22, 24 may be molded with a final contoured external hand grip shape or may be formed with a smooth exterior surface to receive a hand grip sleeve forming the final outer surface of the hand grip.

Referring to FIG. 3, the support body 16 includes means defining an aperture 30 which rigidly engages a metal tubular stem member 32 extending substantially vertically through the support body 16 and defining a longitudinal axis 34. The stem member 32 includes a clamping end 36 distal from the support body 16 and the clamping end 36 defines a ramp surface 38 extending upwardly at an acute angle relative to the longitudinal axis 34 for cooperation with a wedge nut 40. The wedge nut 40 has a cooperating ramp surface 42 and includes a threaded aperture 44 for receiving the shank portion 46 of a clamping bolt 48 in threaded engagement. The aperture 30 in the support body 16 extends through an upper surface 50 of the support body 16 to provide access to a head portion 52 of the clamping bolt 48 which is located at an adjustment end 54 of the stem member 32.

Referring to FIGS. 1 and 3, an insert member 56 is provided in the form of a substantially planar plate which is rigidly attached to the stem member 32 by means of a welded connection. The insert member 56 extends at an angle relative to the longitudinal axis 34 and passes upwardly and forwardly through an interior portion of the support body 16 toward the central hub portion 14. The stem member 32 and insert member 56 are molded in place during the formation of the integral unit 12 and the insert member 56 is provided with apertures 58, 60 for receiving plastic material forming the support body 16 therethrough to thereby rigidly connect the insert member 56 to the integral unit 12.

The clamping end 36 of the stem member 32 is of conventional design and thus the handlebar 10 of the present invention is adapted to be installed in existing bicycle steering columns. The adjustment end 54 of the stem member 32 provides a rigid means for connecting the stem member 32 to the integral unit 12 while also permitting rotation of the clamping bolt 48 in order to adjust the wedge nut 40 and cause the ramp surfaces 38, 42 to cooperate with each other for clamping the stem member 32 within a bicycle steering column.

As may be seen in FIGS. 1 and 3, first and second brake lever mounts 62, 64 are molded integrally with respective first and second arm portions 18, 20 adjacent to the hand grip portions 22, 24. Each of the brake lever mounts 62, 64 are mounted to front surfaces 66, 68 of the integral unit 12 and extend forwardly away from respective first reference planes defined by sets of lines extending parallel to the longitudinal axis 34 of the stem 32 and passing through a respective central axis 26, 28 of each of the hand grip portions 22, 24. The reference plane passing through the central axis 26 of the left hand grip portion 22 is shown in FIG. 3 and is designated by reference numeral 70.

The brake lever mounts 62, 64 are each formed as integral L-shaped members having a first leg 72, 74 extending away from respective first reference planes, and a second leg 76, 78 extending toward respective first reference planes in a direction away from their respective hand grip portions 22, 24. Each of the brake lever mounts 62, 64 further include a slot 80, 82 in the respective first legs 72, 74 located adjacent to the hand grip portions 22, 24 for receiving a conventional brake actuation lever 84, 86. A first elongated aperture 88, 90 extends through each second leg 76, 78 for receiving a brake cable and each of the apertures 88, 90 extend toward respective first reference planes in a direction away from the hand grip portions 22, 24. A second aperture 92, 94 extends through each of the first legs 72, 74 and each second aperture 92, 94 defines an axis extending toward respective first reference planes in a direction from a top surface to a bottom surface of the handlebar 10 to provide pivot points for pivotally mounting the brake levers 84, 86.

Thus, the brake lever mounts 62, 64 provide a location for mounting conventional brake actuation levers 84, 86 and are configured such that the brake actuation cables will be easily routed toward the stem member 32 supporting the handlebar 10 and to the respective brakes at the front and rear of the bicycle.

Referring to FIGS. 1-3, first and second shift lever mounts 96, 98 are molded into the first and second arm portions 18, 20 adjacent to respective first and second brake lever mounts 62, 64. Each of the shift lever mounts 96, 98 extend upwardly away from second reference planes defined by sets of lines extending perpendicular to the longitudinal axis 34 and passing through respective central axes 26, 28 of the hand grip portions 22, 24. The second reference plane extending through the central axis 26 of the hand grip portion 22 is illustrated in FIG. 3 and is designated by the reference numeral 100.

Each of the shift lever mounts 96, 98 includes a stud portion 102, 104 and an anti-rotation tab 106, 108 for receiving conventional shift lever mechanisms 110, 112, as shown in FIG. 2. The stud portions 102, 104 include a threaded aperture for receiving a mounting screw to mount the mechanisms 110, 112 in a conventional manner, and the threaded apertures each extend along an axis which is substantially parallel to the brake lever pivot axes defined by apertures 92, 94 in respective brake lever mounts 62, 64.

It should be noted that the shift lever mounts 96, 98 may be formed as molded structures extending upwardly from the upper surface of the arm portions 18, 20 or may be in the form of a metal insert which is partially embedded in the arm portions 18, 20 during the molding operation. Alternatively, threaded apertures may be formed through the upper surface of the arm portions 18, 20 for receiving mounting screws for attaching the shift levers.

A further alternative construction for the shift lever mounts 96, 98 is shown in FIG. 4 in which shift lever mount 96' is located within and surrounded by a recess 114. The recess 114 defines inwardly facing walls which are adapted to cooperate with the outer walls of a plug member 116 which is designed to form a cover over the shift lever mechanism 96'. Thus, in the event that the handlebar 112 will be used on a bicycle which does not require a shift lever mechanism, a plug member 116 may be positioned in the recess 114 to form a cover hiding the shift lever mount 96' and thereby form a smooth contour for the upper surface of the handlebar at the location of the shift lever mount 96'.

It should be noted that by molding the shift lever mounts 96, 98 and the brake lever mounts 62, 64 directly into the arm portions 18, 20, it is possible to align the brake and shift lever mounts relative to each other at any desired location along the arm portions 18, 20 without the need for providing clearance for clamping structures which are typically provided on typical shift and brake lever mounting structures.

Also, it should be noted that by providing a handlebar structure which incorporates an insert member welded to a conventional stem member, the present invention provides a lightweight plastic handlebar which is adapted to provide the above-noted brake and shift lever mounts in combination with a handlebar capable of being rigidly mounted at a predetermined orientation within a bicycle steering column.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. An injection molded handlebar for a bicycle, said handlebar comprising:
   a plastic integral unit comprising a central hub portion, a support body and first and second arm portions;
   said central hub portion defining an upper central portion of said handlebar;
   said support body being formed integrally with said hub portion and extending downwardly from a rear portion of said hub portion;
   said first and second arm portions being formed integrally with said hub portion and extending laterally from said hub portion in opposite directions, each of said arm portions terminating in a handgrip portion distal from said hub portion;
   said support body including means defining an aperture rigidly engaging a tubular stem member extending substantially vertically through said support body,
   said stem member defining a longitudinal axis and including a clamping end distal from said support body, said clamping end defining a ramp surface extending upwardly at an acute angle relative to said longitudinal axis for cooperation with a wedge nut;
   said stem member including an adjustment end, said aperture in said support body extending through an upper surface of said support body to provide access to a clamping bolt having a head located at said adjustment end and a body extending downwardly through said stem and engaging a wedge nut located at said clamping end; and
   an insert having a first edge rigidly attached to said stem member and having an opposite edge surrounded by molded material forming said plastic integral unit wherein said insert is molded in place during formation of said plastic integral unit.

2. The handlebar of claim 1, wherein said stem member is a metal cylinder molded in place within said support body.

3. The handlebar of claim 1 wherein said insert extends at an angle relative to said longitudinal axis upwardly and forwardly through an interior portion of said support body toward said central hub portion.

4. The handlebar of claim 3, wherein said insert is a substantially planar plate including means defining apertures therethrough, wherein plastic forming said support body is received through said apertures in said plate to rigidly connect said plate to said integral unit.

5. The handlebar of claim 1, including at least one brake lever mount molded integrally with and extending forwardly from one of said first and second arm portions.

6. The handlebar of claim 5, including means defining a shift lever mount molded into said integral unit and extending from an upper surface of said handlebar adjacent to said at least one brake lever mount.

7. An injection molded handlebar for a bicycle, said handlebar comprising:
   a plastic integral unit comprising a central hub portion, a support body and first and second arm portions,
   said support body defining an upper central portion of said handlebar;
   said support body being formed integrally with said hub portion and including means defining an aperture for a stem member, and said aperture defining a longitudinal axis;
   said first and second arm portions being formed integrally with said hub portion and extending laterally from said hub portion in opposite directions, each of said arm portions terminating in a handgrip portion distal from said hub portion, each said handgrip portion defining a respective central axis through the length thereof;
   a brake lever mount formed integrally with one of said first and second arm portions adjacent to a respective one of said handgrip portions, said brake lever mount extending forwardly away from a reference plane defined by a set of lines extending parallel to said longitudinal axis and passing through said central axis of said respective handgrip portion, and said brake lever mount being molded in place during formation of said plastic integral unit; and
   wherein said brake lever mount is formed as an integral L-shaped member having a first leg extending away from said reference plane and a second leg extending in a direction away from said respective handgrip portion.

8. The handlebar of claim 7, wherein said second leg of said brake lever mount extends toward said reference plane.

9. The handlebar of claim 8, including means defining a slot in said first leg adjacent to said respective handgrip portion for receiving a brake lever.

10. The handlebar of claim 7, including a first aperture for receiving a brake cable, said first aperture extending toward said reference plane in a direction away from said respective handgrip portion.

11. The handlebar of claim 10, including a second aperture defining a pivot point for a brake lever, said second aperture defining an axis extending toward said reference plane in a direction from a top surface to a bottom surface of said handlebar.

12. The handlebar of claim 7, wherein first and second brake lever mounts are provided adjacent to respective handgrip portions, each said brake lever mount being formed as an L-shaped member having a first leg extending away from said reference plane and a second leg extending toward said reference plane in a direction away from a respective handgrip portion.

13. The handlebar of claim 7, wherein said brake lever mount includes means defining an aperture for mounting a brake lever, said aperture defining a brake lever pivot axis, and including a shift lever mount molded into said integral unit adjacent to said brake lever mount, said shift lever mount including a molded cylindrical protrusion defining an axis extending substantially parallel to said brake lever pivot axis.

14. The handlebar of claim 7, including a stem member received within said aperture in said support body and an insert plate attached to said stem member and extending upwardly and forwardly from said stem member through an interior portion of said support body toward said central hub portion.

15. An injection molded handlebar for a bicycle, said handlebar comprising:
a plastic integral unit comprising a central hub portion, a support body and first and second arm portions,
said central body defining an upper central portion of said handlebar;
said support body being formed integrally with said hub portion and including means defining an aperture for a stem member, and said aperture defining a longitudinal axis;
said first and second arm portions being formed integrally with said hub portion and extending laterally from said hub portion in opposite directions, each of said arm portions terminating in a handgrip portion distal from said hub portion, each said handgrip portion defining a respective central axis through the length thereof; and
a shift lever mount molded into one of said first and second arm portions adjacent to a respective one of said handgrip portions, said shift lever mount extending upwardly away from a reference plane defined by a set of lines extending perpendicular to said longitudinal axis and passing through said central axis of said respective handgrip portion, and said shift lever mount being molded in place during formation of said plastic integral unit.

16. The handlebar of claim 15, including means defining a recess having a wall formed around said shift lever mount for receiving and cooperating with an outer wall of a plug member for covering said shift lever mount.

17. The handlebar of claim 15, wherein said shift lever mount includes a cylindrical stud extending upwardly from said handlebar.

18. The handlebar of claim 15, wherein said shift lever mount is defined by a metal insert molded into said integral unit.

19. The handlebar of claim 15, including a brake lever mount formed integrally with said handlebar adjacent to said shift lever mount, said brake lever mount extending forwardly away from a plane defined by a set of lines extending parallel to said longitudinal axis and passing through said central axis of said respective handgrip portion.

20. The handlebar of claim 15, including a stem member received within said aperture in said support body and an insert plate attached to said stem member and extending upwardly and forwardly from said stem member through an interior portion of said support body toward said central hub portion.

21. An injection molded handlebar for a bicycle, said handlebar comprising:
a plastic integral unit comprising a central hub portion, a support body and first and second arm portions;
said central hub portion defining an upper central portion of said handlebar;
said support body being formed integrally with said hub portion and extending in a downward and rearward direction from said hub portion;
said first and second arm potions being formed integrally with said hub portion and extending laterally from said hub portion in opposite directions, each of said arm portions terminating in a substantially cylindrical handgrip portion distal from said hub portion, each said handgrip portion defining a respective central axis through the length thereof;
said support body including means defining an aperture rigidly engaging a tubular stem member extending substantially vertically through said support body;
said stem member defining a longitudinal axis and including a clamping end distal from said support body, said clamping end defining a ramp surface extending upwardly at an acute angle relative to said longitudinal axis for cooperation with a wedge nut;
said stem member including an adjustment end, said aperture in said support body extending through an upper surface of said support body to provide access to a clamping bolt having a head located at said adjustment end and a body extending downwardly through said stem and engaging a wedge nut located at said clamping end;
an insert member having a first edge rigidly attached to said stem member and having an opposite edge surrounded by molded material forming said plastic integral unit wherein said insert in molded in place during formation of said plastic integral unit, and said insert member extends at an angle relative to said longitudinal axis upwardly and forwardly through an interior portion of said support body toward said central hub portion to rigidly connect said stem member to said integral unit;
first and second brake lever mounts molded integrally with respective ones of said first and second arm portions adjacent to said handgrip portions during formation of said plastic integral unit, each of said brake lever mounts extending forwardly away from respective first reference plates defined by sets of lines extending parallel to said longitudinal axis and passing through a respective central axis of each of said handgrip portions; and first and second shift lever mounts molded into said first and second arm portions adjacent to a respective one of said first and second brake lever mounts during formation of said plastic integral unit, said shift lever mounts extending upwardly away from second reference planes defined by sets of lines extending perpendicular to said longitudinal axis and passing through a respective central axis of each of said handgrip portions.

* * * * *